Patented May 30, 1939

2,159,986

UNITED STATES PATENT OFFICE 2,159,986

ART OF PRODUCING IMPROVED AQUEOUS-OIL EMULSIONS

Philip P. Gray, Forest Hills, and Irwin Stone, New York, N. Y., assignors to Wallerstein Company, Inc., New York, N. Y., a corporation of New York No Drawing. Application December 28, 1935, Serial No. 56,536

16 Claims. (Cl. 99—163)

This invention relates to the art of producing improved aqueous-oil emulsions.

More particularly the invention relates to aqueous-oil emulsions suitable for use as food and for medicinal purposes. Examples of such emulsions in common every day use are mayonnaise, salad dressing, cheese, butter, egg yolk, such as commercial frozen egg yolk, cod liver oil and other fish oil emulsions used for therapeutic purpose.

As is well known, certain changes normally occur in oils and fats, usually the result of oxidation, and commonly referred to as development of rancidity. Ordinarily these changes take place during storage, i. e., any period that may occur prior to consumption or other use, and are influenced by time, temperature, exposure to sunlight, the influence of catalysts, such as contact with certain metals, and other factors.

These same changes occur in the oil phase of aqueous-oil emulsions such as those mentioned. It will be recognized that these products represent a wide diversity of emulsions in which the relative amounts of water and oil vary considerably. In each case, however, there is present water and an oil, the oil being of such character as to be susceptible to oxidation with resulting rancidity under normal marketing conditions. In fact, in such emulsions the opportunity for oxidation of the oil is very much increased as compared to bulk oil, for the reason that the oil is dispersed throughout the aqueous phase, presenting a tremendously increased surface in contact with water in which oxygen may be, and usually is, dissolved.

The changes referred to, normally occurring in these emulsions, may and usually do have objectionable results, at least two of which are serious. First, the rancid condition resulting from the changes involves off-tastes and off-flavors which usually render the products unsaleable and unusable. Second, the changes referred to may result in the destruction or impairment of valuable accessory constituents. For example, certain oxidizable vitamines, notably vitamines A and E, which may be and often are present, are apt to be destroyed and therapeutic substances which may be dissolved in medicinal emulsions are apt to lose their therapeutic power because of oxidation.

It has been proposed to treat oils and fats with so-called anti-oxidants, with a view to preventing development of rancidity and the production of stale off-flavors. Among the substances which have been so used are alpha-naphthol, catechol, 1-8 naphthalene diol, alpha-naphthylamine, pyrogallol, quinone etc. These substances are all characterized by the fact that they are not normal constituents of food or food products nor metabolic products of animal organism. They are, as a rule, soluble in oil but have a limited or no solubility in water. Products of the class outlined are not used in food products and only to a limited extent, if at all, in medicinal products. One reason why they are not so used is that they contribute to the product to which they are added, tastes and flavors more objectionable than those resulting from rancidity and there may be other reasons.

In any event, and even if the tastes and flavors which they impart could be disregarded, these substances can not be effectively used in aqueous-oil emulsions as anti-oxidants. It is our belief that because of the much greater susceptibility to oxidation of emulsions, as compared to bulk oils, the substances mentioned, and more particularly since they are oil-soluble and not water-soluble, are too weak and ineffective to prevent the changes which result in the development of rancidity.

It is an object of the present invention to provide a method of so producing or so treating aqueous-oil emulsions that the changes which result in rancidity are materially inhibited if not entirely avoided.

It is a further object of the invention to provide a method of so producing or so treating an aqueous-oil emulsion that the destruction of any oil-soluble vitamines that may be present is much less likely to occur.

It is a further object of the invention to provide a method of rendering aqueous-oil emulsions relatively stable to oxidation.

We have discovered that by the introduction into the emulsion's aqueous phase of certain substances soluble therein, the tendency of the oil phase to become rancid is inhibited to a high degree and, in fact, prevented for practical purposes and under normal conditions and periods of storage.

According to the present invention, there is introduced into the aqueous phase of the emulsion, either before or after the two phases are intermixed, one or more substances characterized by being non-toxic, by having relatively great solubility in water and limited solubility in oil, and by having the capability of substantially lowering the oxidation-reduction potential of the aqueous phase. In carrying out the invention in what is now considered the best advantage, the substance used will have the further characteristic that it either is a substance occurring naturally in human food or is readily derived from such a substance.

While various substances having the above mentioned characteristics may be used, we have found ascorbic acid to be particularly suitable. We have found, for example, that when ascorbic acid is dissolved in the aqueous phase of a mayonnaise to the extent of about 30 mg. per pound of finished product, a high degree of protection against the development of rancidity and against stale and rancid taste and flavor is afforded, even under adverse storage periods and conditions. At the same time, the destruction of any fat-soluble vitamines, such as vitamines A and E, which are particularly susceptible to oxidation, is largely prevented.

We have found that in the course of storage of aqueous-oil emulsions prepared as described, the ascorbic acid content of the product decreases with time, presumably as a result of its own oxidation. While the exact mechanism of the behavior of the ascorbic acid is not definitely known, we believe that it acts on the aqueous phase of an emulsion in such a way as to lower its oxidation-reduction potential to the extent that substantially no oxidation of the oil-phase constituents can take place until oxidation of the ascorbic acid itself has occurred.

While the amount of added material may vary widely, in carrying out the invention to what is now considered the best advantage, the ascorbic acid is added in such quantities that a substantial amount will remain in its original form, i. e., unoxidized, at the time of consumption of the emulsion following any normal storage period. Since the tendency to the development of rancidity and the destruction of vitamines depends on the nature of the emulsion, the manner in which it is packaged and the condition of storage, the amounts used for the best results will depend on the circumstances. We have found that with emulsions normally having a relatively short commercial life, such, for example, as butter, as little ascorbic acid as 5 mg. per pound of emulsion is sufficient in most instances. On the other hand, the longer the probable or desired storage period, the more ascorbic acid is ordinarily required. Other factors which call for increased amounts are high storage temperatures, e. g. summer storage, packaging in contact with metals, storage subject to the influence of light, as in glass containers. In general, therefore, the amount of ascorbic acid to be used varies in accordance with the probability of the development of rancidity for a given emulsion under given storage conditions. So far as we are now aware, there are no harmful or undesirable effects from the addition of any amounts of ascorbic acid, so that amounts over and above what is necessary to give the desired results are merely surplusage. Consequently, there appears to be no upper limit of the amount that can be used, except as such upper limit may be influenced by the cost factor.

When the nature of the emulsion permits, such as in the case of mayonnaise, the ascorbic acid is preferably dissolved in the aqueous phase before the two phases are inter-mixed. When this is not practicable, as in the case of egg yolk, butter, etc., the ascorbic acid may be thoroughly mixed in, the material being first warmed if necessary or desirable.

Other materials having the general characteristics above set forth may be used with or in lieu of ascorbic acid. For example, so-called reductone sometimes called glucic acid. This is a carbo-hydrate derivative probably present as an intermediate product in the assimilation of glucose in human metabolism and may be prepared synthetically from various hexoses. Dihydroxy maleic acid may also be used. This is probably an intermediate product in the assimilation of tartaric acid in human metabolism, tartaric acid being normally present in the diet. Dihydroxy maleic acid may be prepared synthetically by suitable oxidation of tartaric acid. Other examples of materials that may be used are the analogues or isomers of ascorbic acid, such as gluco-ascorbic acid, arabo-ascorbic acid etc., derived chemically from the sugars and having chemical properties similar to naturally occurring ascorbic acid.

It will be noted that the compounds above referred to as suitable for carrying out the invention have, according to present chemical knowledge, the common structural grouping of

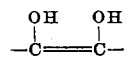

namely, the en-diol group.

It will be recognized that many compounds other than those mentioned can be derived from sugars and similar bodies that would possess the desired properties above referred to. Ascorbic acid, however, is now considered to effect the desired results more advantageously. Moreover, ascorbic acid has the additional advantage that it endows the emulsion with many desirable nutritive and physiological properties characteristic of vitamine C.

Aqueous-oil emulsions produced or treated as described have the advantage that the potency of any oil-soluble vitamines that may be present is retained. In addition there is the distinct commercial advantage that the shelf life of the emulsions is materially increased with a consequent decrease in the loss resulting from units becoming unusable or unsaleable because of rancidity.

What is claimed is:

1. An aqueous-oil emulsion characterized by the presence therein of an agent capable of stabilizing the emulsion against oxidation, said agent being ascorbic acid and being present in an amount sufficient to effect such stabilizing to a substantial degree.

2. The method of protecting aqueous-oil emulsions against oxidation and the development of rancidity, which comprises introducing into the aqueous phase of the emulsion an agent capable of stabilizing the emulsion against oxidation, said agent being an analogue of ascorbic acid and being introduced in sufficient quantity to effect such stabilizing in a substantial degree.

3. An aqueous-oil emulsion characterized by the presence therein of an agent capable of stabilizing the emulsion against oxidation, said agent being an analogue of ascorbic acid and being present in an amount sufficient to effect such stabilizing to a substantial degree.

4. A salad dressing characterized by the presence therein of an agent capable of stabilizing the salad dressing against oxidation, said agent being a compound selected from the group consisting of ascorbic acid, analogues and isomers thereof, reductone and dihydroxy maleic acid and being present in an amount sufficient to effect such stabilizing to a substantial degree.

5. A fish-oil emulsion characterized by the presence therein of an agent capable of stabilizing the emulsion against oxidation, said agent being a compound selected from the group consisting of ascorbic acid, analogues and isomers thereof, reductone and dihydroxy maleic acid and being present in an amount sufficient to effect such stabilizing to a substantial degree.

6. The method of protecting aqueous-oil emulsions against oxidation and the development of rancidity, which comprises introducing into the aqueous phase of the emulsion an agent capable of stabilizing the emulsion against oxidation, said agent being ascorbic acid and being introduced in sufficient quantity to effect such stabilizing in a substantial degree.

7. The method of protecting aqueous-oil emulsions against oxidation and the development of rancidity, which comprises introducing into the aqueous phase of the emulsion an agent capable of stabilizing the emulsion against oxidation, said agent being an ascorbic acid and being introduced in sufficient quantity to effect such stabilizing in a substantial degree.

8. The method of protecting aqueous-oil emulsions against oxidation and the development of rancidity, which comprises introducing into the aqueous phase of the emulsion an agent capable of stabilizing the emulsion against oxidation, said agent being gluco-ascorbic acid and being introduced in sufficient quantity to effect such stabilizing in a substantial degree.

9. An aqueous-oil emulsion characterized by the presence therein of an agent capable of stabilizing the emulsion against oxidation, said agent being gluco-ascorbic acid and being present in an amount sufficient to effect such stabilizing to a substantial degree.

10. An aqueous-oil emulsion characterized by the presence therein of an agent capable of stabilizing the emulsion against oxidation, said agent being an ascorbic acid and being present in an amount sufficient to effect such stabilizing to a substantial degree.

11. The method of protecting aqueous-oil emulsions against oxidation and the development of rancidity, which comprises introducing into the aqueous phase of the emulsion an agent capable of stabilizing the emulsion against oxidation, said agent being a compound selected from the group consisting of ascorbic acid, analogues and isomers thereof, reductone and dihydroxy maleic acid and being introduced in sufficient quantity to effect such stabilizing in a substantial degree.

12. An aqueous-oil emulsion characterized by the presence therein of an agent capable of stabilizing the emulsion against oxidation, said agent being a compound selected from the group consisting of ascorbic acid, analogues and isomers thereof, reductone and hydroxy maleic acid and being present in an amount sufficient to effect such stabilizing to a substantial degree.

13. The method of protecting salad dressings against oxidation and the development of rancidity, which comprises introducing in to the salad dressing an agent capable of stabilizing the same against oxidation, said agent being a compound selected from the group consisting of ascorbic acid, analogues and isomers thereof, reductone and dihydroxy maleic acid, and being introduced in sufficient quantity to effect such stabilizing in a substantial degree.

14. The method of protecting fish-oil emulsions against oxidation and the development of rancidity, which comprises introducing into the emulsion an agent capable of stabilizing the same against oxidation, said agent being a compound selected from the group consisting of ascorbic acid, analogues and isomers thereof, reductone and dihydroxy maleic acid, and being introduced in sufficient quantity to effect such stabilizing in a substantial degree.

15. A mayonnaise characterized by the presence therein of an agent capable of stabilizing the mayonnaise against oxidation, said agent being a compound selected from the group consisting of ascorbic acid, analogues and isomers thereof, reductone and dihydroxy maleic acid, and being present in an amount sufficient to effect such stabilizing to a substantial degree.

16. The method of protecting mayonnaise against oxidation and the development of ransidity, which comprises introducing into the mayonnaise an agent capable of stabilizing the same against oxidation, said agent being a compound selected from the group consisting of ascorbic acid, analogues and isomers thereof, reductone and dihydroxy maleic acid, and being introduced in sufficient quantity to effect such stabilizing in a substantial degree.

PHILIP P. GRAY.
IRWIN STONE.